United States Patent
Dressler et al.

(10) Patent No.: US 9,975,374 B2
(45) Date of Patent: May 22, 2018

(54) TWO-PART WHEEL SPIDER WITH PROFILE SPOKES

(71) Applicant: THYSSENKRUPP CARBON COMPONENTS GMBH, Kesselsdorf (DE)

(72) Inventors: Michael Dressler, Dresden (DE); Jens Werner, Coswig (DE); Christian Köhler, Dresden (DE); André Bartsch, Dresden (DE); Sandro Mäke, Dohma (DE)

(73) Assignee: THYSSENKRUPP CARBON COMPONENTS GMBH, Kesselsdorf (DE)

( * ) Notice: Subject to any disclaimer, the term of this patent is extended or adjusted under 35 U.S.C. 154(b) by 0 days. days.

(21) Appl. No.: 14/430,677

(22) PCT Filed: Oct. 10, 2013

(86) PCT No.: PCT/EP2013/071204
§ 371 (c)(1),
(2) Date: Mar. 24, 2015

(87) PCT Pub. No.: WO2014/072151
PCT Pub. Date: May 15, 2014

(65) Prior Publication Data
US 2015/0231917 A1    Aug. 20, 2015

(30) Foreign Application Priority Data

Nov. 6, 2012   (DE) .......................... 10 2012 022 148

(51) Int. Cl.
*B60B 3/08*   (2006.01)
*B60B 1/14*   (2006.01)
(Continued)

(52) U.S. Cl.
CPC .................. *B60B 3/08* (2013.01); *B60B 1/12* (2013.01); *B60B 1/14* (2013.01); *B60B 3/10* (2013.01); *B60B 3/12* (2013.01); *B60B 2900/311* (2013.01)

(58) Field of Classification Search
CPC .... B60B 1/08; B60B 1/12; B60B 1/14; B60B 3/08; B60B 3/10; B60B 3/12;
(Continued)

(56) References Cited

U.S. PATENT DOCUMENTS 1,470,742 A * 10/1923 Ibach ........................ B60B 3/08
301/64.102
2,045,902 A * 6/1936 Eksergian ................. B60B 1/12
301/35.59
(Continued)

FOREIGN PATENT DOCUMENTS

CN   101 528 478 A   9/2009
DE   72 00 847 U     5/1972
(Continued)

*Primary Examiner* — Frank B Vanaman
(74) *Attorney, Agent, or Firm* — McGlew and Tuttle, P.C.

(57) ABSTRACT

A wheel includes a rim having a rim base and a two-part wheel spider. The wheel spider includes two molded parts. The first molded part forms the spokes having an open cross-section and is joined to the second molded part. The spokes of the first molded part are completely or partially closed along the profile length by the second molded part. The wheel spider is preferably integrated in the rim in an interlocking manner. The rim and the two-part wheel spider can consist of metal, but in particular preferably of composite fiber material.

16 Claims, 21 Drawing Sheets

(51) Int. Cl.
*B60B 1/12* (2006.01)
*B60B 3/10* (2006.01)
*B60B 3/12* (2006.01)

(58) Field of Classification Search
CPC .. B60B 3/087; B60B 5/00; B60B 5/02; B60B 2900/311; B60B 2900/5112
See application file for complete search history.

(56) References Cited

U.S. PATENT DOCUMENTS

| | | | | |
|---|---|---|---|---|
| 3,567,285 | A * | 3/1971 | Faurot | B60B 1/003 29/894.38 |
| 4,256,347 | A * | 3/1981 | Reppert | B60B 1/00 29/894.342 |
| 4,316,637 | A | 2/1982 | Reynolds et al. | |
| 4,527,839 | A * | 7/1985 | Fujitaka | B60B 5/02 301/64.704 |
| 5,782,540 | A * | 7/1998 | Camfield | B60B 3/004 301/64.202 |
| 5,863,103 | A * | 1/1999 | Bonning | B60B 3/001 301/63.108 |
| 6,068,350 | A | 5/2000 | Baumgarten et al. | |
| 6,231,129 | B1 | 5/2001 | Stach | |
| 2002/0084689 | A1 * | 7/2002 | Sebode | B60B 1/06 301/64.705 |
| 2003/0189373 | A1 * | 10/2003 | Spoelstra | B29C 70/48 301/64.703 |
| 2005/0104441 | A1 * | 5/2005 | Bertelson | B29C 70/345 301/64.703 |
| 2014/0375112 | A1 * | 12/2014 | Werner | B29C 70/34 301/63.109 |

FOREIGN PATENT DOCUMENTS

| | | |
|---|---|---|
| DE | 36 20 097 A1 | 12/1987 |
| DE | 296 23 451 U1 | 7/1998 |
| DE | 198 07 943 C2 | 12/2002 |
| DE | 101 30 450 A1 | 1/2003 |
| DE | 10 2006 051 867 A1 | 5/2008 |
| DE | 10 2010 010 512 A1 | 9/2011 |
| FR | 2 516 866 A1 | 5/1983 |
| FR | 2 820 685 A1 | 8/2002 |
| WO | 98/23455 A1 | 6/1998 |

* cited by examiner

Detail I

Detail II

Detail III

Detail IV

Detail IV

Detail IV

Detail V

Detail VIa

Detail VII

Detail IX

Detail XI

Detail X

TWO-PART WHEEL SPIDER WITH PROFILE SPOKES

CROSS REFERENCE TO RELATED APPLICATIONS

This application is a United States National Phase Application of International Application PCT/EP2013/071204 filed Oct. 10, 2013 and claims the benefit of priority under 35 U.S.C. § 119 of German Patent Application DE 10 2012 022 148.7 filed Nov. 6, 2012, the entire contents of which are incorporated herein by reference.

FIELD OF THE INVENTION

The present invention pertains to a wheel spider with profile spokes, which is composed of at least two individual parts, which mesh with one another in a positive-locking manner.

BACKGROUND OF THE INVENTION

A number of constructions are known, which use wheel spiders made of fiber composites. These are often made initially during the manufacture as disk wheel spiders and are provided with recesses after the consolidation, for example, by means of CNC milling. The continuous course of the fibers is naturally interrupted in the process. This has an adverse effect on the strength of the end product.

The type of construction of a wheel made of fiber composites according to DE 10 2010 010 512 A1 provides for connecting the disk-shaped wheel spider to the rim well via an undercut, which is brought about by braiding around the circumferential contour of the wheel spider. The need for a circumferential contour disadvantageously leads to limitations in the freedom of design of the wheel spiders.

Another known construction (DE 10 2006 051 867 A1) provides for a wheel spider made of composite material, which is composed of ring-shaped spoke segments located on one another and consist of circumferential unidirectional fiber strands, which were manufactured by means of winding technology. This manufacturing method is very expensive and requires a large number of different operations, which can be automated with difficulty only. Moreover, a wheel of this construction has only a low crash resistance.

SUMMARY OF THE INVENTION

An object is therefore to provide a wheel construction that offers a great freedom in designing the wheel spider but also meets the high requirements of the automobile industry in terms of crash resistance.

The wheel according to the present invention has a wheel spider and a rim, wherein the rim itself again comprises a rim well and wheel flanges. The wheel preferably consists entirely or partially of fiber composite or metal. The rim preferably consists entirely of fiber composite or metal. The wheel spider comprises two molded parts, wherein the first molded part forms the spokes with an open profile cross section. The wheel or the first molded part has two, three or more spokes. The spokes have a profile axis, which extends along its longitudinal extension, usually from the wheel hub to the rim. The second molded part closes the open profile cross section along the profile axes of the first molded part entirely or only partially. The first molded part preferably consists of fiber composite, while the second molded part may consist of fiber composite or metal. In another preferred embodiment, the first molded part also consists of metal, and the methods described below for processing fiber composites are replaced by the corresponding methods for processing metals (deep-drawing, rolling, etc.), which are known to the person skilled in the art. The wheel hub is preferably also integrated in the wheel spider and is formed by one of the two molded parts, the second molded part especially preferably forming the wheel hub. The wheel hub is also preferably formed by both molded parts together. The profile cross sections of the first and second molded parts are preferably U-shaped in the area of the spokes, and the openings of the two molded parts face each other and face away from one another and the profile cross section of one molded part encloses that of the other one in a clamp-like manner. The profile cross section of the first molded part especially preferably encloses that of the second one. In other preferred embodiments, the profile cross sections mesh with one another conically or by forming a click connection or lie one on the other, forming a butt joint.

Embodiments are preferred in which the profile axes are closed at the ends of the second molded parts located on the outside, so that at least one entirely closed cavity is formed between the first molded part and the second molded part. Thus, contamination of the gap between the first molded part and the second molded part is advantageously avoided. Furthermore, open ends of the second molded parts are also preferred, which in turn advantageously improves the cooling of the wheel spider.

The two parts of the wheel spider are connected to one another in a positive-locking manner preferably by the axially directed areas of the profile spokes as well as of the wheel hub flange meshing with one another, so that at least one, typically two or more contact surfaces are formed. The two molded parts are preferably connected with one another on these contact surfaces. This connection is preferably brought about in a positive-locking manner (by means of snap-in connection of the two molded parts with one another) or by connection in substance (by means of an adhesive connection or welded connection). A combination of connection in substance and positive-locking connection is also possible.

The wheel spider is preferably connected to the rim well by an undercut connection of the spoke segments. The ends of the individual spokes are preferably connected now with the rim well in a positive-locking manner by braiding around (preforming of the rim well by means of the braiding-around method). The fully or partially consolidated or even non-consolidated ends of the spoke segments are braided over for this during the manufacture of the rim well. A positive-locking connection and, in case the same matrix material (or chemically bonding matrix materials) are used, also a connection in substance develops with the matrix material of the molded part due to the impregnation with matrix material and the subsequent consolidation of the rim well.

The connection surfaces of the spokes with the rim well are enlarged in another preferred embodiment via straps entering or exiting tangentially. These are preferably formed by the ends of the spokes being bent over in parallel to the inner circumference of the rim and thus extending in some sections on the inner side of the rim.

In a preferred embodiment, the first molded part has the hub. This possibly surrounds the axle opening and has openings for the bolts. The second molded part completely or partially closes the open profile cross section of the first molded part and likewise has bolt holes. At least one spacing element made of metal or fiber composite, which absorbs the oppressing force of the bolts, is preferably located for load absorption between the first and second molded parts as well as surrounding the bolt holes. The spacing element is preferably positioned in the first molded part by a flat load absorption element (preferably one made of metal). In an especially preferred embodiment, the second molded part itself consists of metal and acts as a load absorption element by absorbing the pressing force of the bolts. The second molded part is not hollow now, at least around the bolt holes, but has continuous material, so that the pressing pressure of the bolts is absorbed on both sides and supported by the molded part.

The spokes may advantageously have any desired cross sections, which make it possible for the star rim to have a correct shape for the load, correspondingly shaped U-profiles being especially preferred.

The wheel preferably consists of fiber-reinforced plastic. Carbon fiber-reinforced composites, for example, with epoxy resin as the matrix material, are preferably used as material combinations. Steel, aluminum, titanium or magnesium or the alloys known from the state of the art for manufacturing wheels are especially preferred for embodiments that are manufactured partially or entirely of metal.

The construction according to the present invention advantageously makes it possible to further reduce the weight due to the looser spoke geometry. It is advantageous, furthermore, that there is no need for CNC finishing operations, so that the reinforcing fiber structure remains undamaged. Especially high crash resistance of the wheel spider can thus be achieved.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
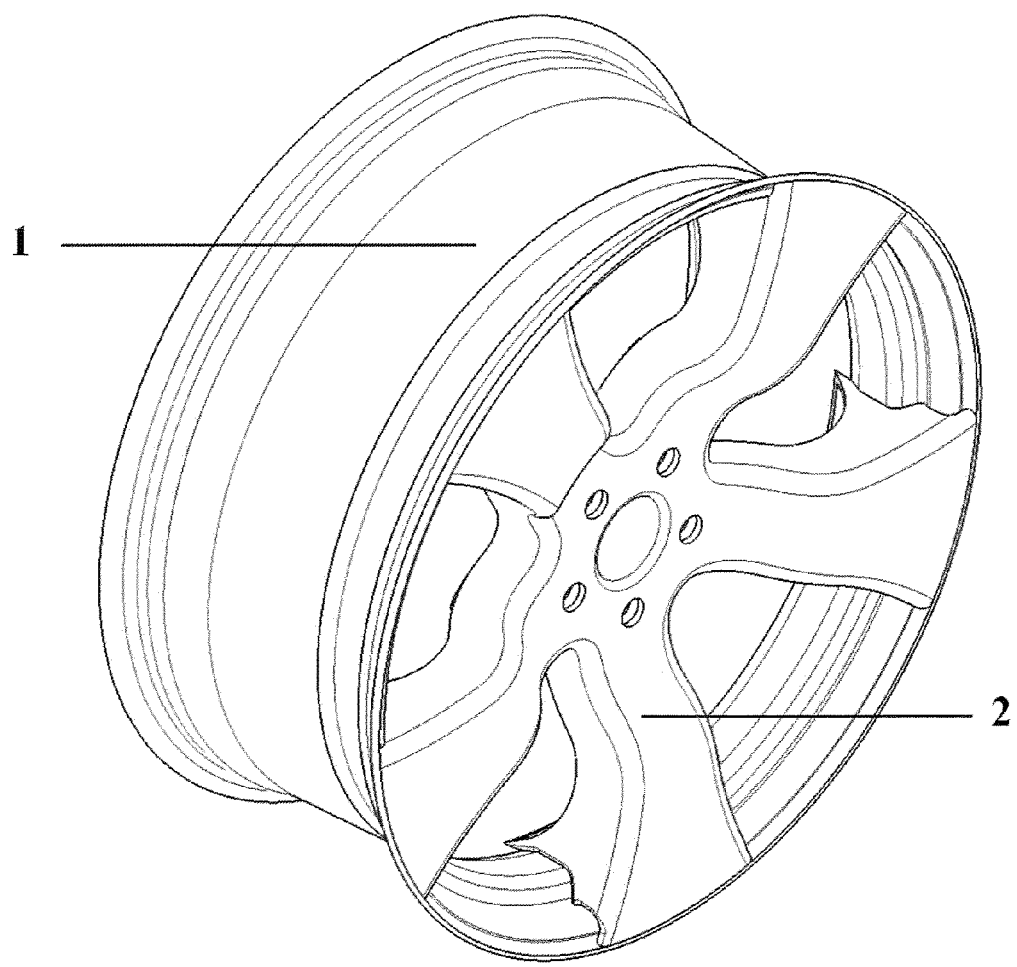
FIG. 1 is a perspective view of an embodiment of a wheel.
Figure 2A:
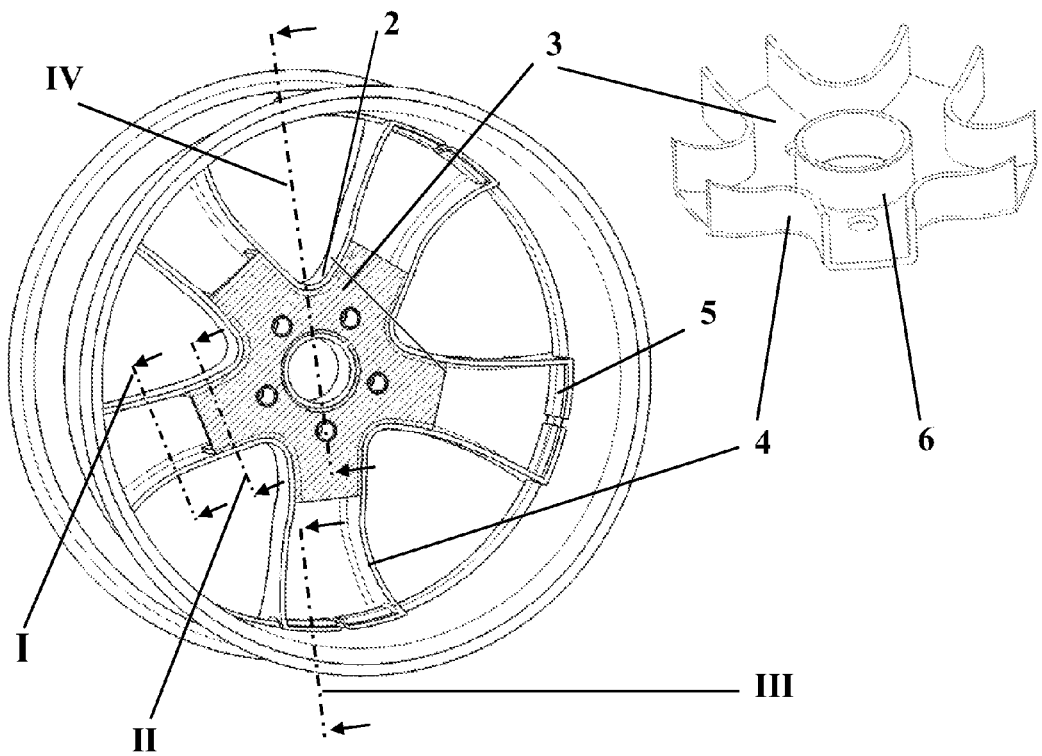
FIG. 2a is a view with details of the embodiment of FIG. 1.
Figure 2A:
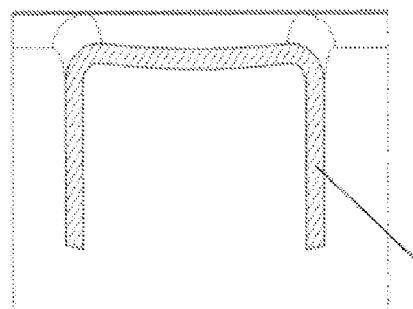
Figure 2A:
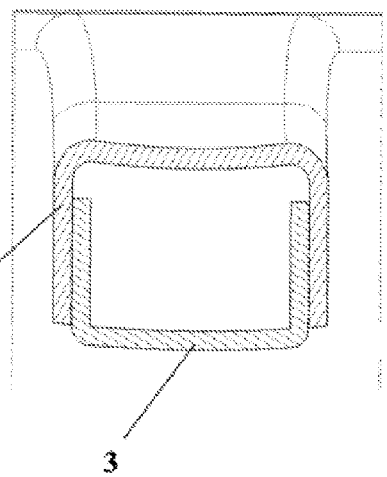
Figure 2B:
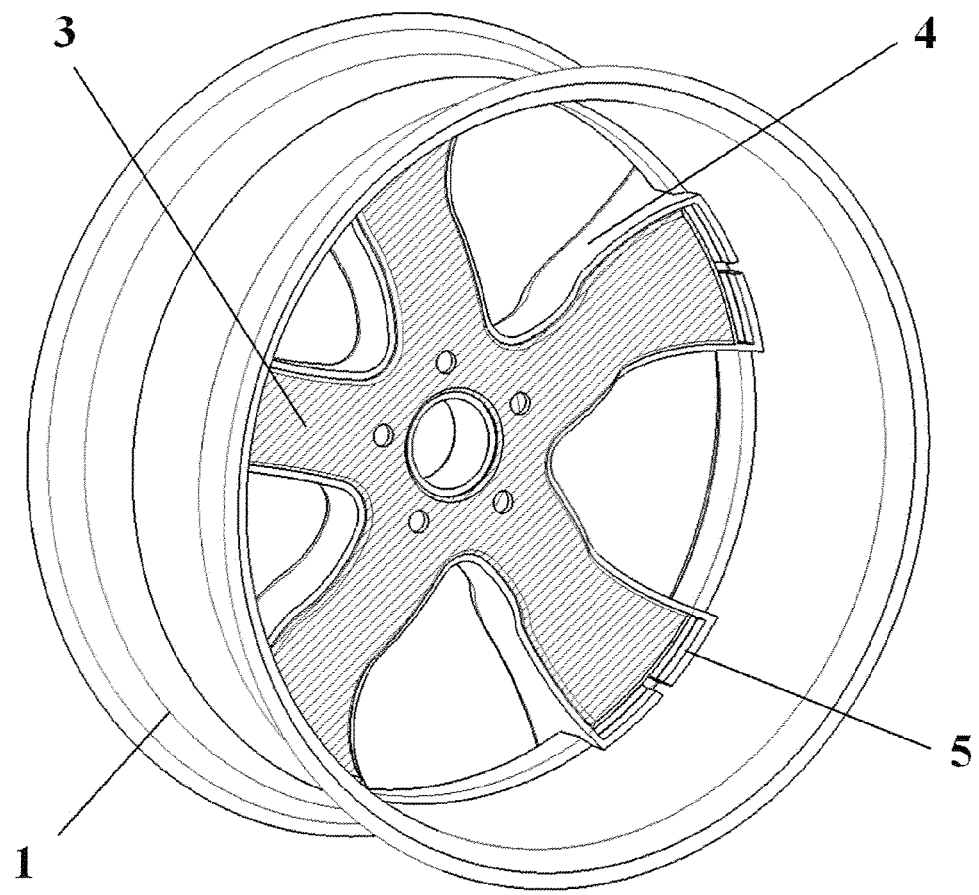
FIG. 2b is a perspective view of the embodiment of FIG. 1.
Figure 2C:
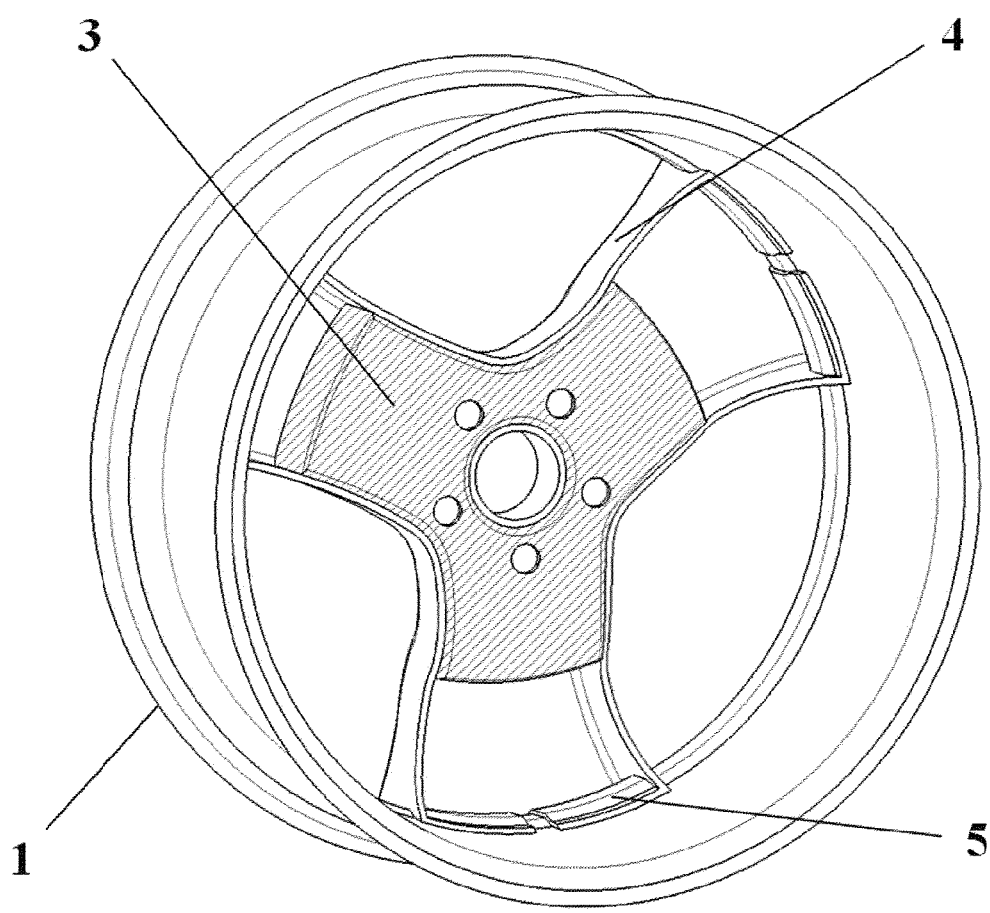
FIG. 2c is a perspective view of an alternative of the embodiment of FIG. 1.
Figure 3:
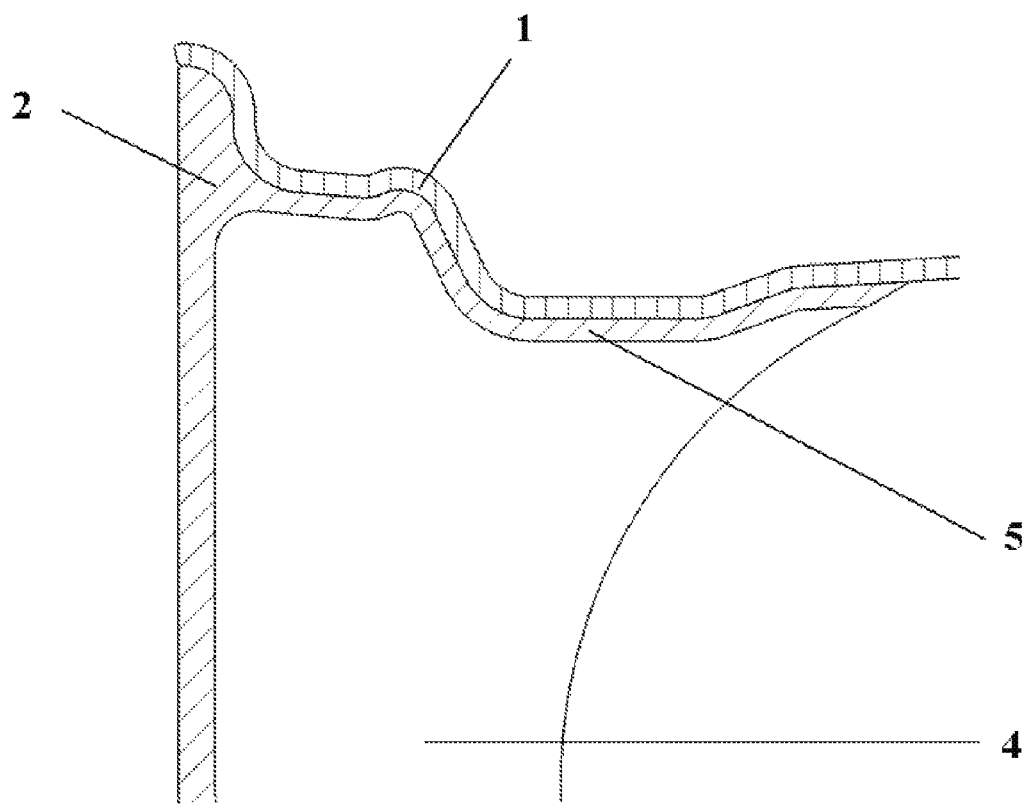
FIG. 3 is a cross sectional view of the embodiment of FIG. 1.
Figure 4A:
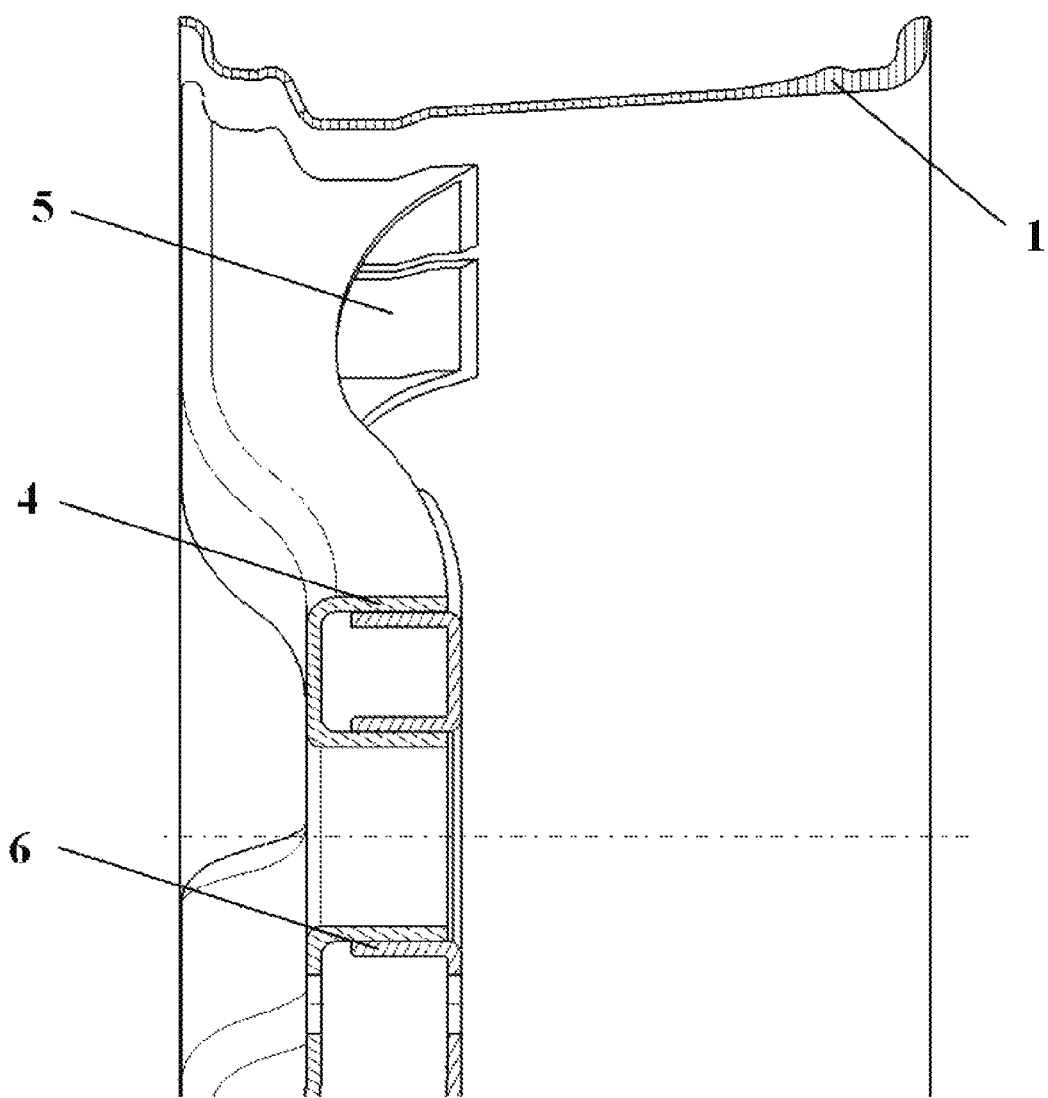
FIG. 4a is a cross sectional view of the embodiment of FIG. 1 showing a version of the connection surfaces.
Figure 4B:
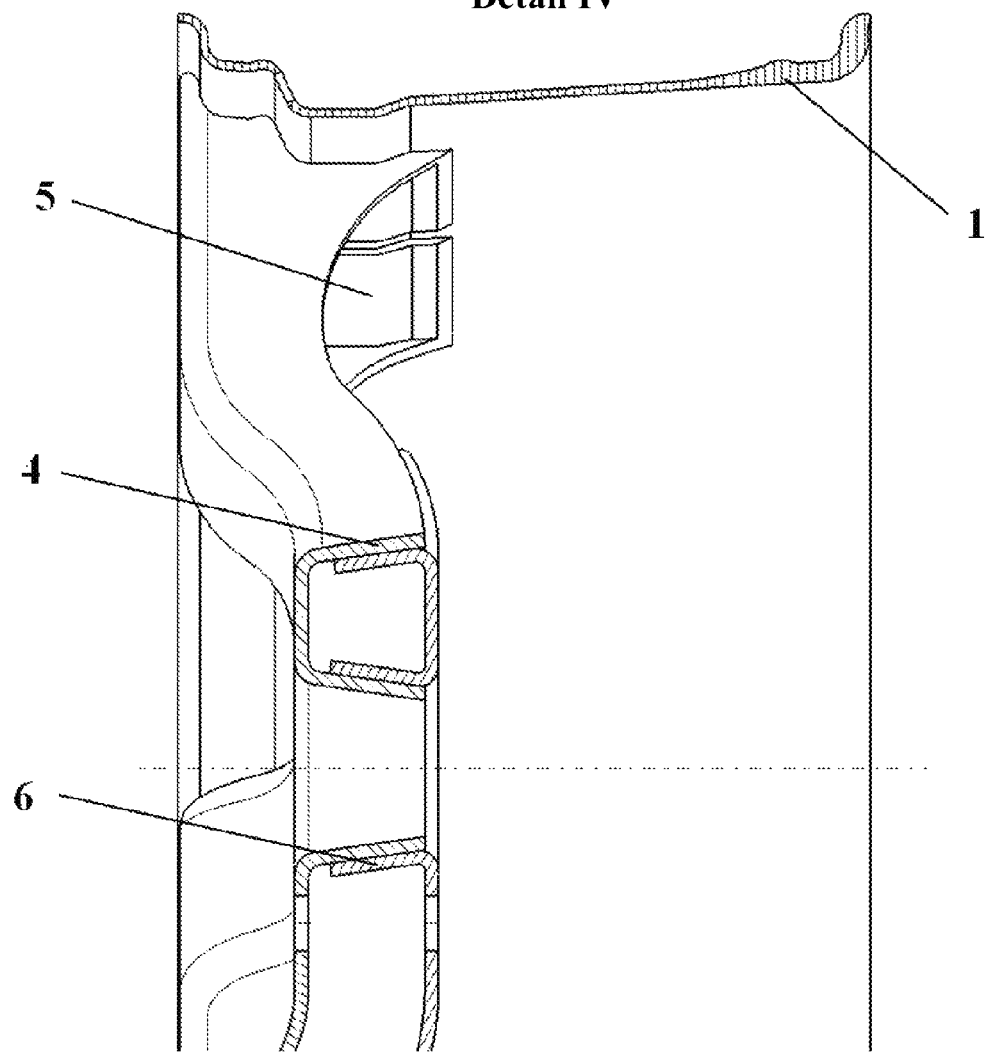
FIG. 4b is a cross sectional view of the embodiment of FIG. 1 showing another version of the connection surfaces.
Figure 4C:
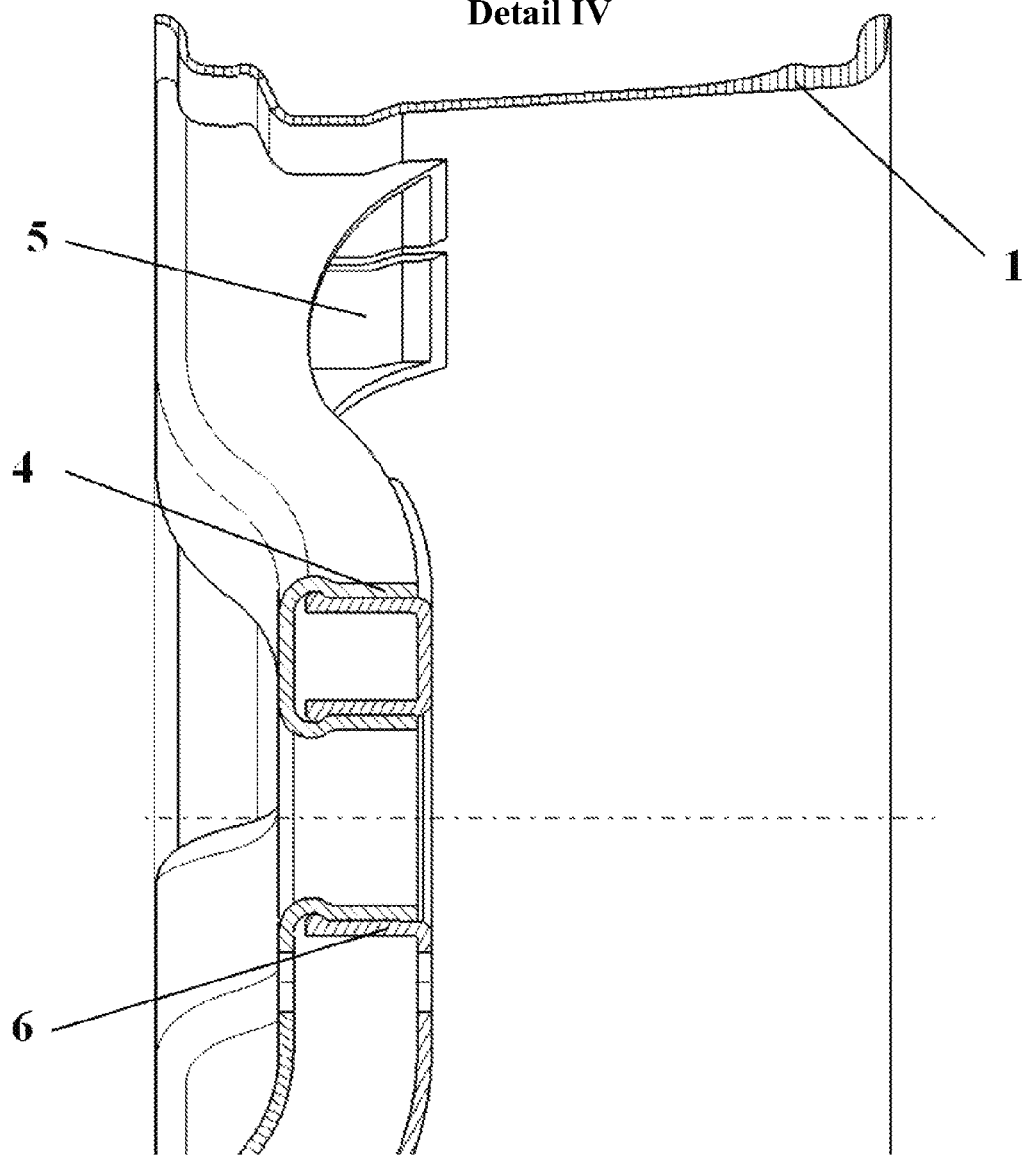
FIG. 4c is a cross sectional view of the embodiment of FIG. 1 showing another version of the connection surfaces.
Figure 5:
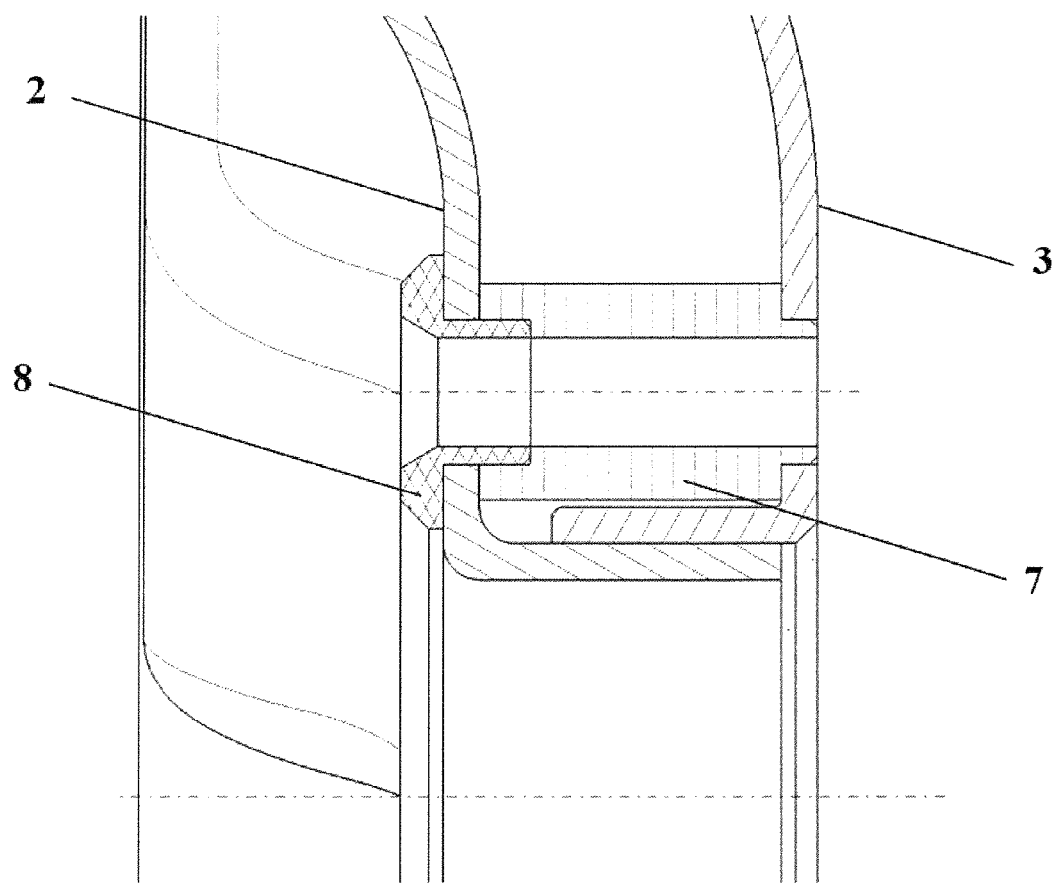
FIG. 5 is a cross sectional view of the embodiment of FIG. 1 showing spacing segments received by a load application element.

Exemplary Embodiment 1 According to FIG. 1, FIG. 2 (a-c), FIG. 3, FIG. 4 (a-c), FIG. 5:

In the first exemplary embodiment, the wheel spider is composed of two separate molded parts (2, 3), which form the spoke segments as well as the wheel hub. The spoke segments of the first molded part (2) are characterized on the vehicle side by an open cross section. Detail I shows the cross section of a spoke, the one in the area in which the molded part 2 does not close the opening in the U-shaped cross section of the first molded part (2). It can be recognized in detail II how this opening is covered in another area by the second molded part (3), which meshes with same in a positive-locking manner and likewise has a U-shaped cross section.The spokes are integrated axially and radially by means of a positive-locking connection (FIG. 3) in the textile structure of the rim well (1). The undercut is formed by the lateral, axially directed areas (4) of the spoke cross section, which are folded over toward the central axis of the spoke under the drop base connection and thus guarantee a flat connection (5). The connection surface or the wheel hub of the wheel spider is embodied by a second molded part (3), as a result of which the cross section of the spokes is completely closed (FIG. 2a, detail II). The second molded part may be designed here such that the open spoke cross section is partially (FIG. 2a) or completely closed in the radial direction to below the drop base of the rim (FIG. 2b). Furthermore, the spoke ends of the second molded part may be designed such that a closed cavity protected from media is generated between the two molded parts (FIG. 2c). The number of spoke segments can be selected as desired.

The two molded parts (2, 3) are connected with one another in a positive-locking manner via the axially directed areas of the spoke profiles and the hub centering (6), as a result of which a possible bonding surface is formed. The connection surfaces of the two molded parts may be directed in relation to one another axially (FIG. 4a), conically (FIG. 4b) and/or by means of a snap-in connection (FIG. 4c) to center the two molded parts. In addition, the two molded parts are aligned in relation to one another via spacing segments (7), which are received by a flatly connected load application element (8), which is additionally used to absorb the wheel bolt elements, and thus accurately position the second molded part (3).

Figure 6:
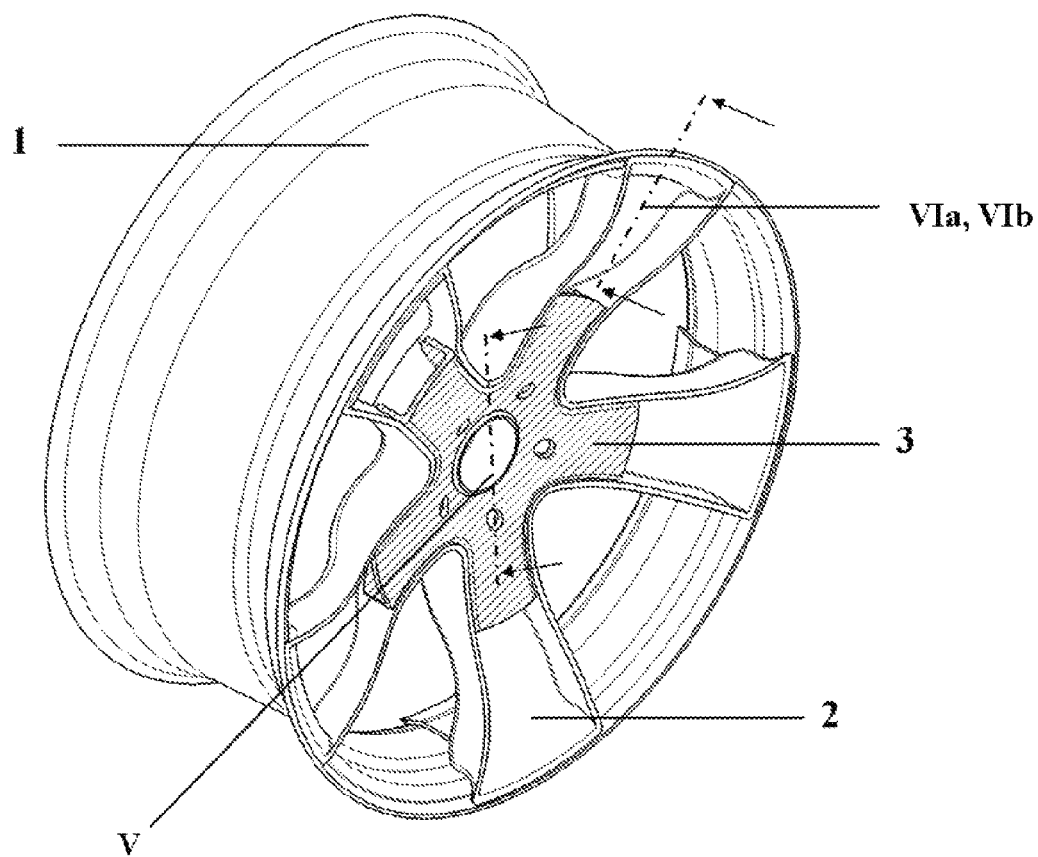
FIG. 6 is a perspective view of another embodiment of a wheel.
Figure 7:
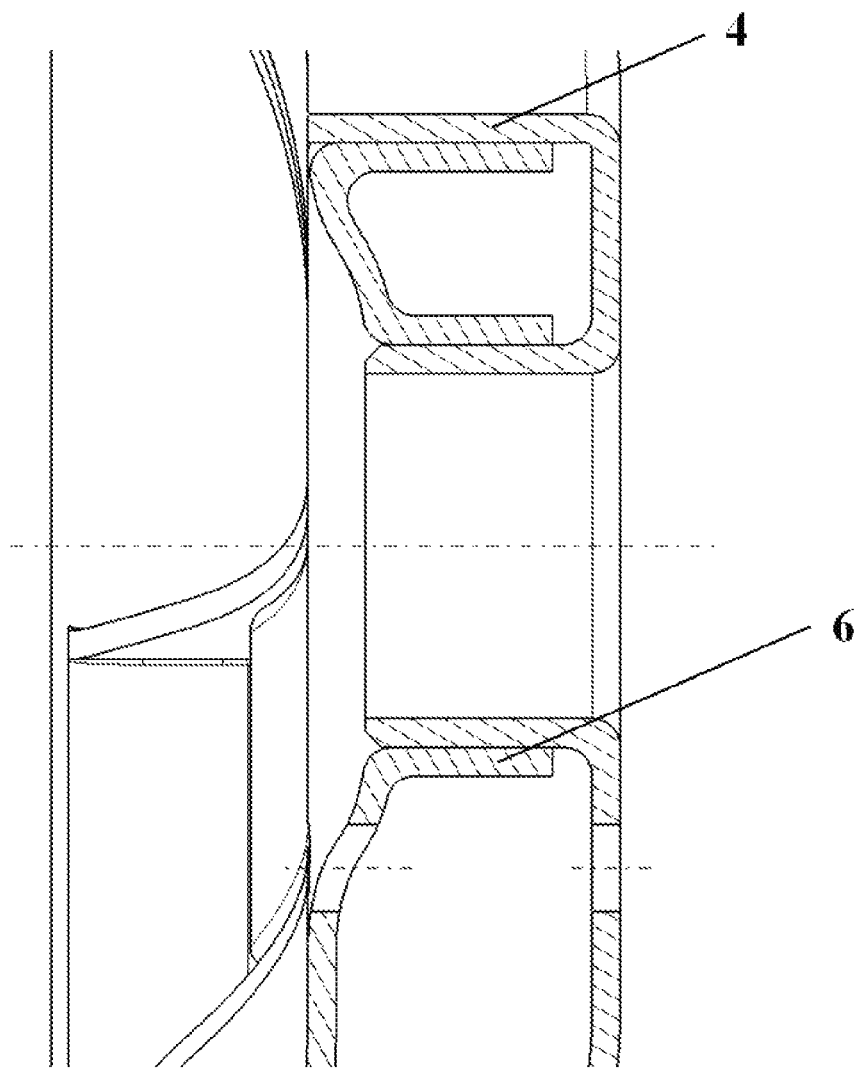
FIG. 7 is a cross sectional view of the embodiment of FIG. 6.
Figure 8A:
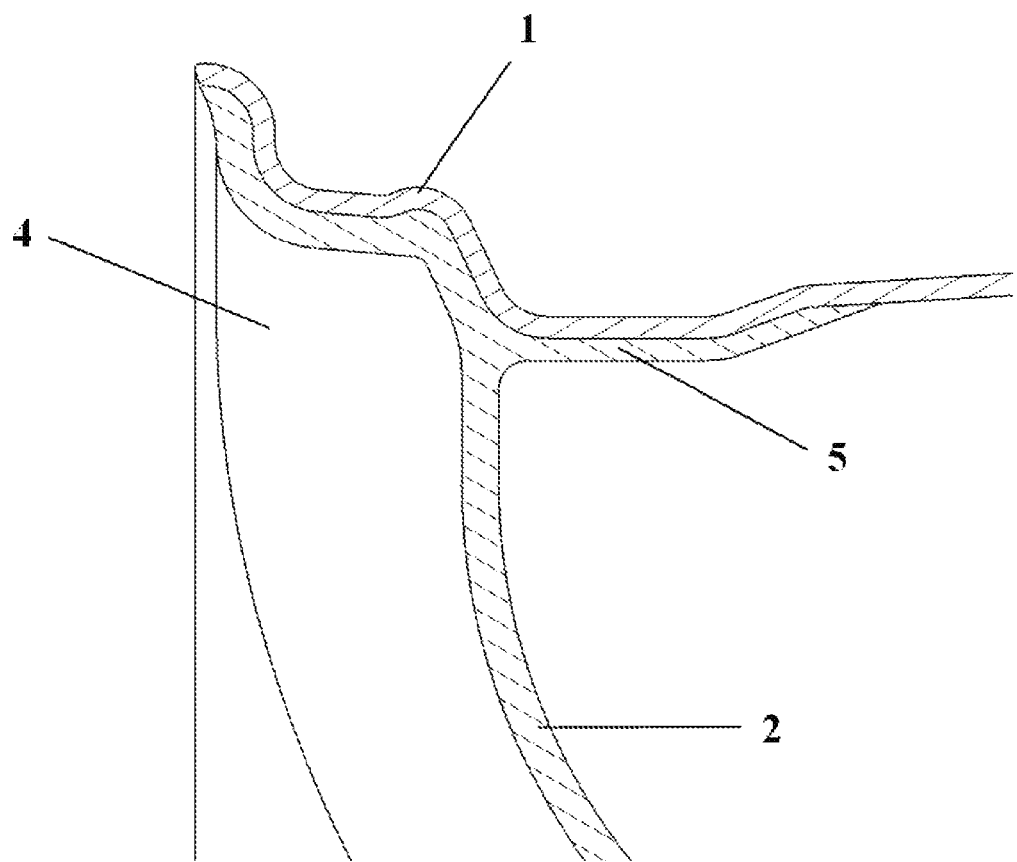
FIG. 8a is a cross sectional view showing textile braided structure of the rim well of the embodiment of FIG. 6.
Figure 8B:
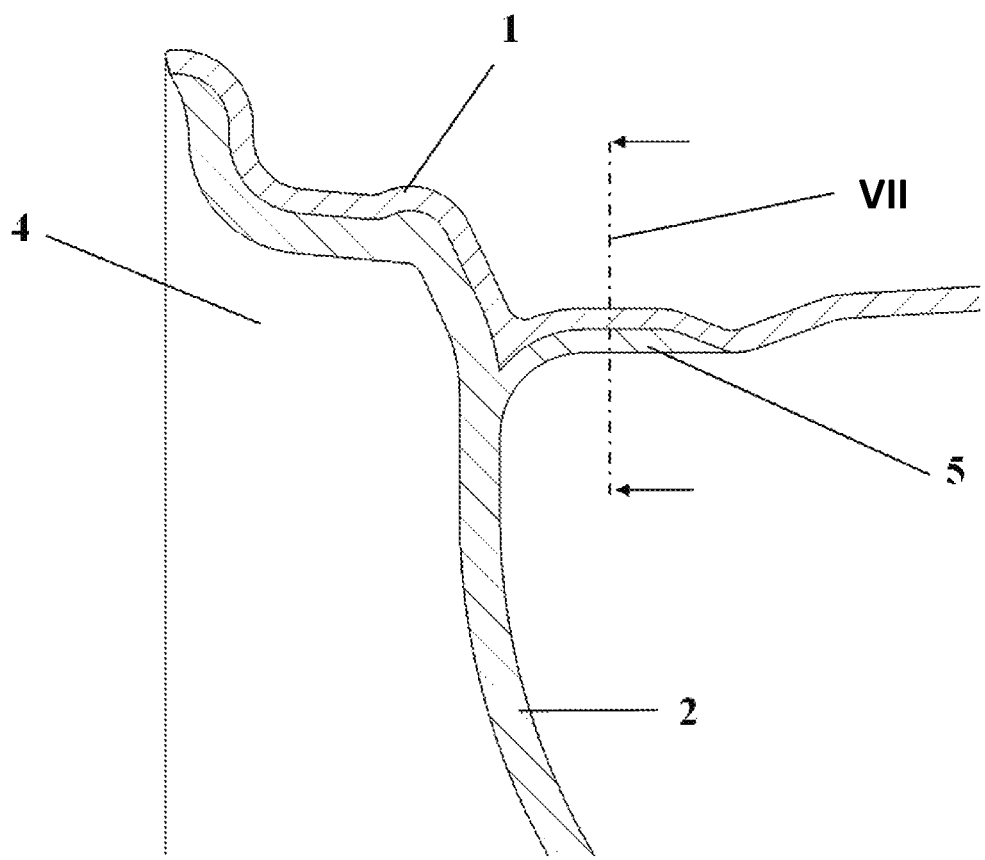
FIG. 8b is a cross sectional view showing another textile braided structure of the rim well of the embodiment of FIG. 6.
Figure 9:
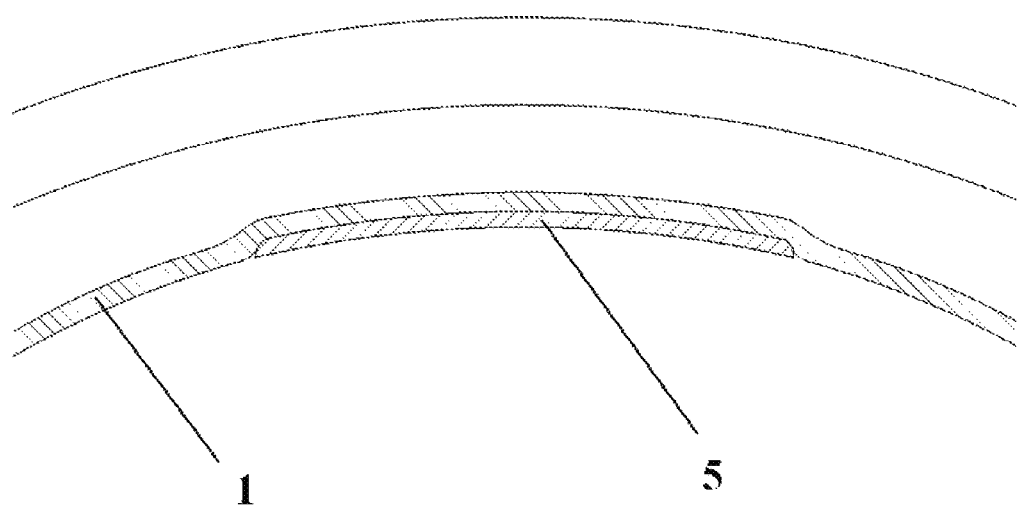
FIG. 9 is a cross sectional view of the embodiment of FIG. 6.

Exemplary Embodiment 2 According to FIG. 6, FIG. 7, FIG. 8 (a-b), FIG. 9:

The wheel spider likewise consists of two fiber composite molded parts in this exemplary embodiment. The open cross section of the spokes is located now on the side facing away from the vehicle, so that the connection of the spoke segments to the rim well can take place over a large area. Furthermore, the spokes are connected with the drop base of the rim well by an undercut positive-locking connection, and the undercut straps of the spoke segments (5) can be integrated on or in the textile braided structure of the rim well (FIGS. 8a, 8b). This molded part (2) assumes at the same time the function of the wheel hub connection surface of the wheel. The second molded part (3) is positioned by means of corresponding spacing segments and thus closes the open cross section of the spoke segment completely.

The two molded parts (2, 3) are connected with one another in a positive-locking manner via the borders of the spoke profiles and the hub centering (6), as a result of which a possible bonding surface is formed.

Figure 10:
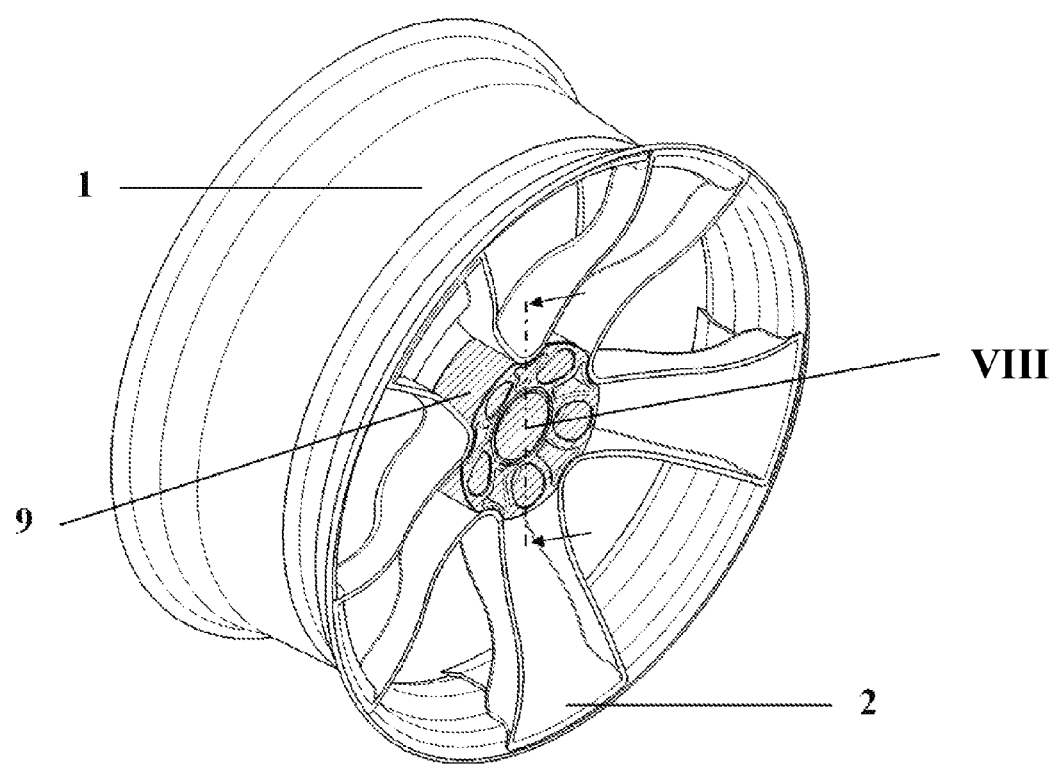
FIG. 10 is a perspective view of another embodiment of a wheel.
Figure 11:
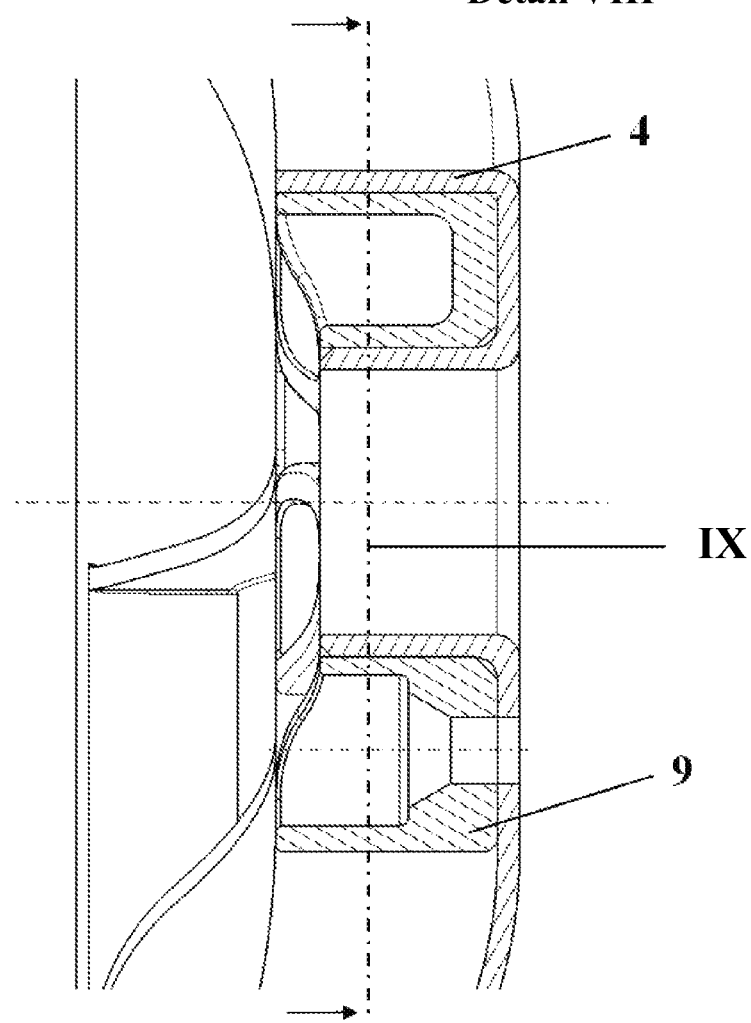
FIG. 11 is a cross sectional view of the embodiment of FIG. 10.
Figure 12:
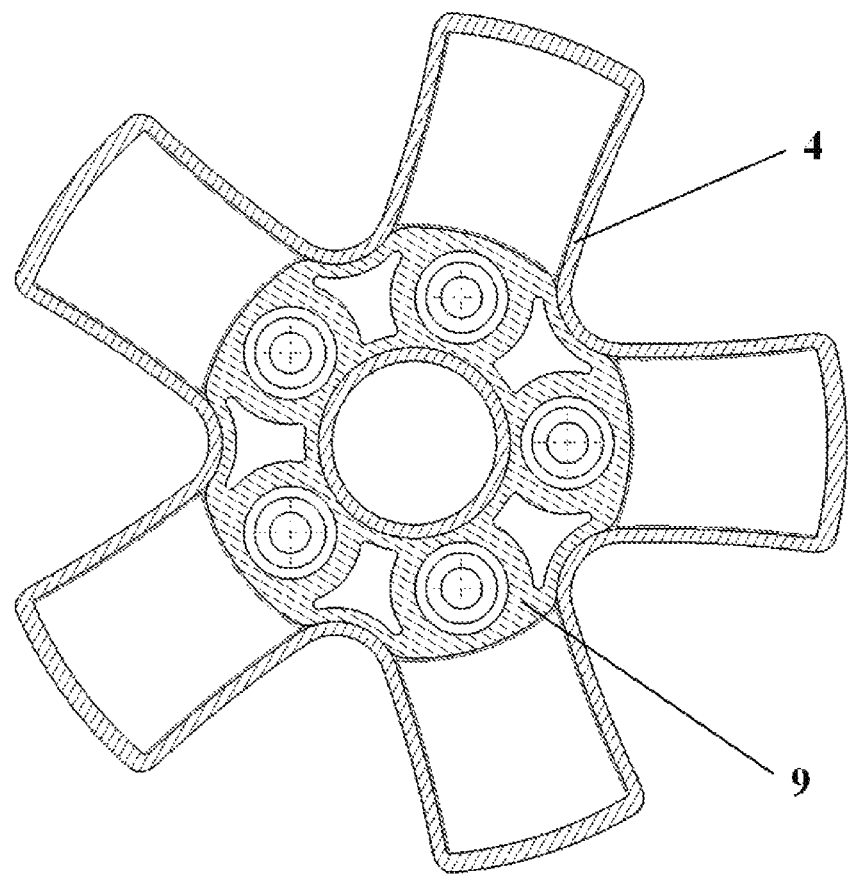
FIG. 12 is a cross sectional view of a metallic load application element of the embodiment of FIG. 10.

Exemplary Embodiment 3 According to FIG. 10, FIG. 11, FIG. 12:

This exemplary embodiment differs from the preceding ones in that the wheel spider is composed of a metallic load application element (9) and a molded part made of fiber composite (2). The molded part with the spoke segments and with the wheel hub connection surface is connected, as was described in the exemplary embodiment 2, with the rim well. The metallic load application element (9) is characterized by a circumferential wave contour, as a result of which the element used to receive the wheel bolt elements is integrated between the axially directed areas of the spoke segments and the hub centering of the molded part such that it is secured against rotation (FIG. 12). The contact surfaces may be used for an additional bonded connection here.

Figure 13:
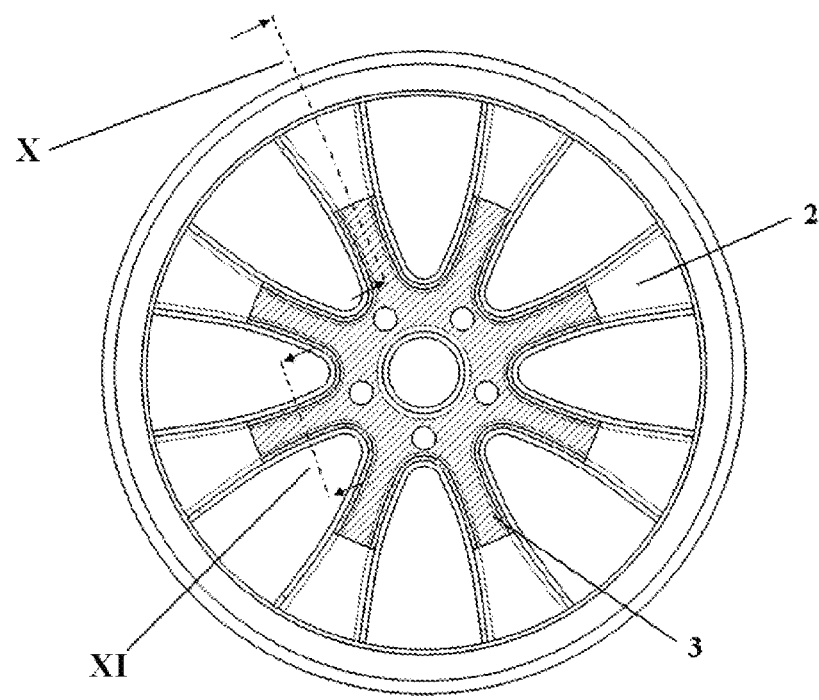
FIG. 13 is a perspective view of another embodiment of a wheel with a detail XI.
Figure 13:
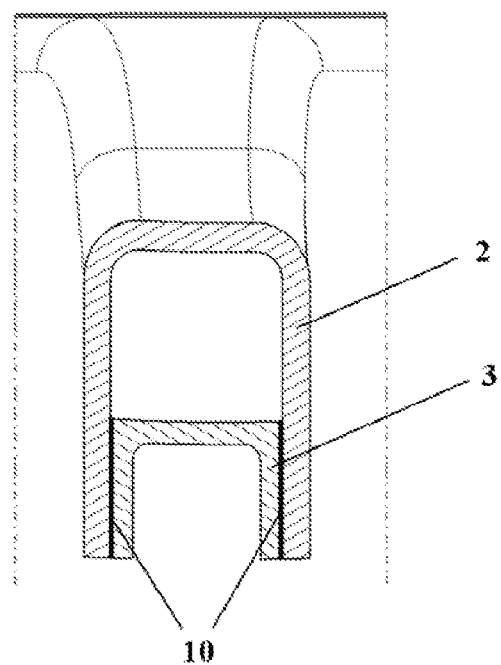
Figure 14:
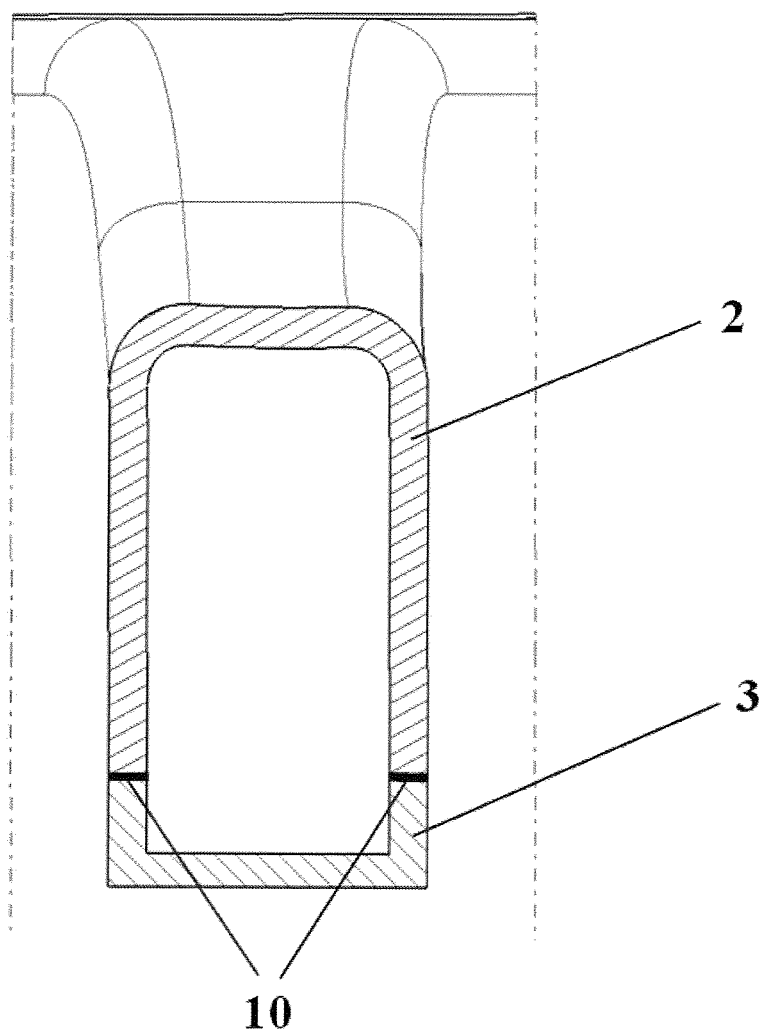
FIG. 14 is a cross sectional view of the embodiment of FIG. 13.
Figure 15:
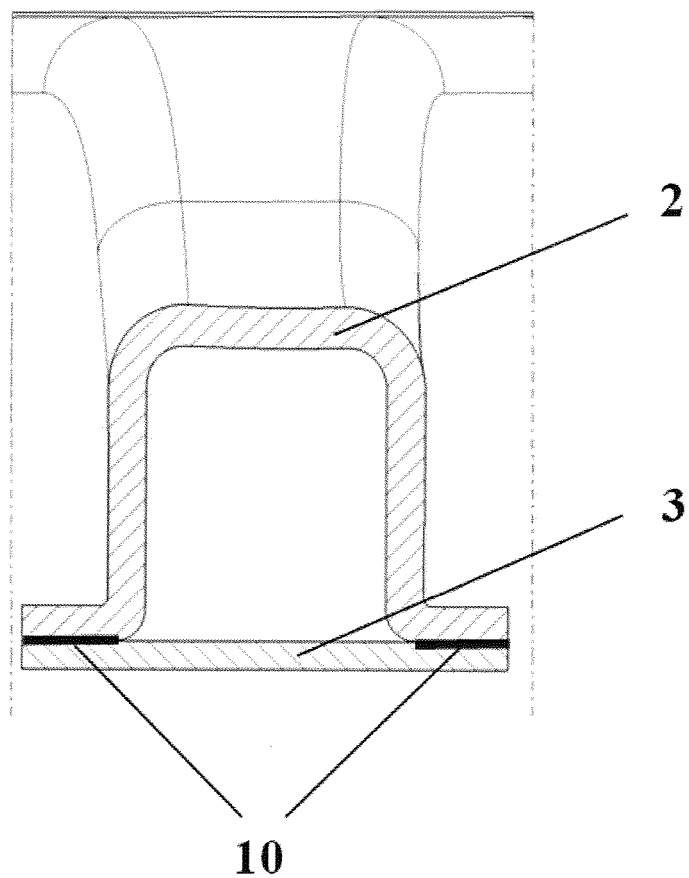
FIG. 15 is a cross sectional view of the embodiment of FIG. 13.
Figure 16:
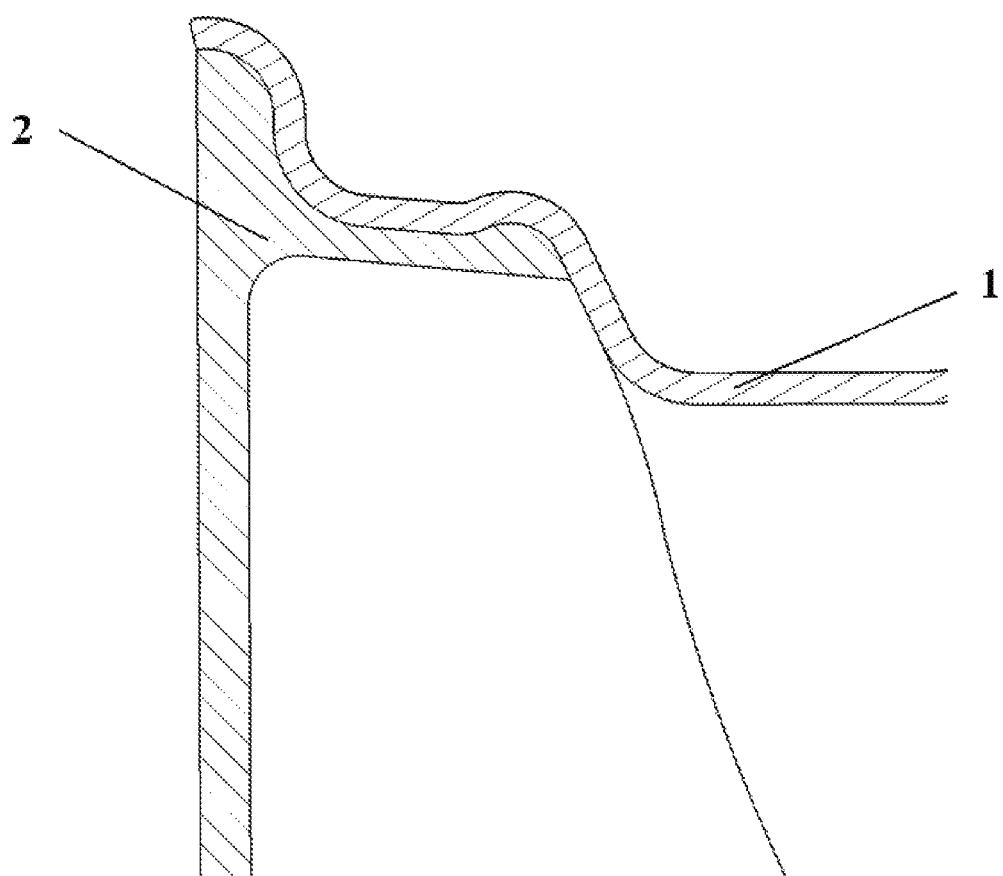
FIG. 16 is a cross sectional of the embodiment of FIG. 13.

Exemplary Embodiment 4 According to FIG. 13, FIG. 14, FIG. 15, FIG. 16:

This exemplary embodiment differs from exemplary embodiment 1 in that the two molded parts are joined together with a profile cross section, preferably U-profiles, which are open on the vehicle side (FIG. 13). The joint zone (10) thus formed may be used as a bonding surface. Furthermore, the joint zone (10) may be designed such that the connection of the two molded parts is embodied by means of a butt joint (FIG. 14) or overlapping connection (FIG. 15). The undercut, positive-locking connection between the first molded part and the rim well may be performed now by means of the securing hump of the rim well (hump) (FIG. 16).

While specific embodiments of the invention have been shown and described in detail to illustrate the application of the principles of the invention, it will be understood that the invention may be embodied otherwise without departing from such principles.

The invention claimed is:

1. A wheel of a vehicle, the wheel spider comprising:
a first molded part forming spokes, each of said spokes having U-shaped open circumferential cross section opened in a first axial direction of the wheel, said spokes being formed for supporting the vehicle, each of said spokes having undercut straps at one radially outer end of said spokes, each of said undercut straps extending in a second axial direction, said second axial direction being opposite to said first axial direction;
a second molded part joined to said first molded part and partially closing said U-shaped open circumferential cross section of said first molded part along a radial length of said spokes, said second molded part having a cross section, said second molded part having a U-shaped open circumferential cross section, said cross sections of said first and second molded parts having complementary conical shapes in the axial directions, legs of said U-shaped open circumferential cross section of one of said first and second molded parts being arranged inside said U-shaped open circumferential cross section of the other of said first and second molded part, said legs and said conical shapes being arranged to mesh with each other conically;
a rim well connected to said spokes by said undercut straps, said first and second molded parts provide a majority of support between said rim well and an axle of the vehicle.

2. A wheel in accordance with claim 1, wherein the first and second molded parts of the wheel spider are connected with one another in a positive-locking manner via axially directed areas of the first molded part and a hub centering.

3. A wheel in accordance with claim 1, wherein the first and second molded parts of the wheel spider are connected with one another in substance on surfaces that are in contact with one another or along at least one common connection line.

4. A wheel in accordance with claim 1, wherein the open circumferential cross section of the spokes points in a direction of a vehicle central axis or to a side facing away from the vehicle.

5. A wheel in accordance with claim 1, wherein lateral, axially directed contact surfaces of spoke segments and/or a hub centering are bonding surfaces.

6. A wheel in accordance with claim 1, further comprising spacing segments and a flat load application element wherein a position of the second molded part is carried out via the spacing segments, which are positioned by the flat load application element, which is received by the first molded part.

7. A wheel in accordance with claim 1, wherein the wheel spider is composed of the first molded part, which is made of fiber composite and the second molded part which is metallic, which acts as a load application element, wherein the second molded part is connected with the first molded part via axially directed areas of spoke segments and a hub centering such that the second molded part and the first molded part are secured against rotation.

8. A wheel in accordance with claim 7, wherein the load application element forms the wheel hub.

9. A wheel in accordance with claim 1, wherein:
said first and second molded parts completely provide all support between said rim well and an axle of the vehicle.

10. A wheel in accordance with claim 1, wherein:
said spokes include lateral, axially directed areas forming the legs of said U-shape open circumferential cross section, said lateral, axially directed areas being bent over in parallel to an inner circumference of said rim wheel and connect to an inner side of said rim well.

11. A wheel in accordance with claim 1, wherein:
fully, partially consolidated, or non-consolidated ends of said spokes being textile braided over, or around, said rim well for connection of said spokes to said rim well.

12. A wheel in accordance with claim 1, wherein:
said spokes include lateral, axially directed areas forming the legs of said U-shape open circumferential cross section, said lateral, axially directed areas being bent over in parallel to an inner circumference of the rim well and connect to an inner side of the rim well.

13. A wheel of a vehicle, the wheel comprising:
a first molded part having a first radial wall with spokes extending radially outward from said first radial wall, each of said spokes having U-shaped open circumferential cross section opened in an axial direction of the wheel, said spokes being formed for supporting the vehicle, a second molded part having a second radial wall, said second molded part joined to said first molded part and partially closing said U-shaped open circumferential cross section of said first molded part along a radial length of said spokes, second molded part being mounted on said first molded part to have said first and second radial walls axially spaced from each other, said radial walls of said first and second molded parts each define a bolt hole for receiving a single bolt element, said bolt holes and the bolt element being adapted to attach the wheel to the vehicle;

a rim well connected to said spokes, said first and second molded parts provide a majority of support between said rim well and an axle of the vehicle.

14. A wheel in accordance with claim 13, further comprising:

a spacer defining a bolt hole for receiving the bolt element, said spacer being arranged between said radial walls to transfer force from the bolt element from one of said radial walls to the other of said radial walls.

15. A wheel in accordance with claim 13, further comprising:

a hub centering extending axially from, and connecting, said radial wall of one of said molded parts to said other of said radial walls, said hub centering being radially spaced inward from said spokes.

16. A wheel in accordance with claim 13, further comprising:

a hub centering extending axially from, and connecting, said radial wall of one of said molded parts to said other of said radial walls, said hub centering being radially spaced inward from said spokes and said bolt holes, said hub centering forming a bonding surface for said first and second molded parts.

\* \* \* \* \*